Jan. 29, 1957    H. B. SELL ET AL    2,779,681
METHOD OF PREPARING AND PACKAGING MEAT
Filed Oct. 31, 1952
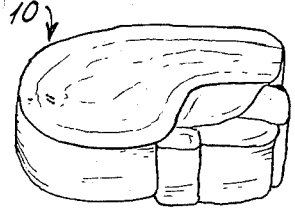
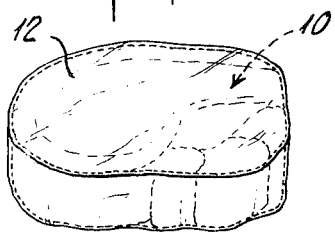
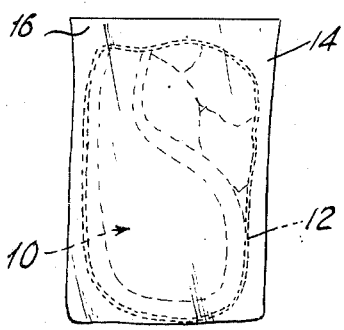
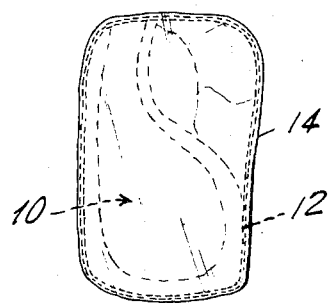
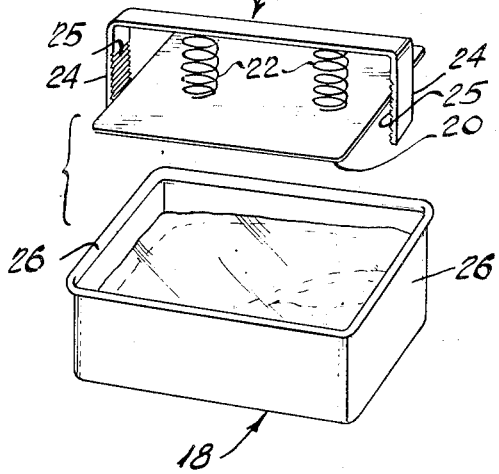
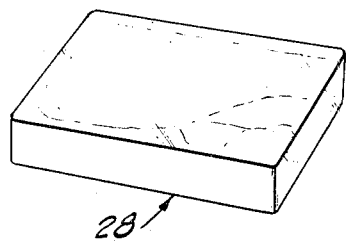
INVENTORS:
HENRY B. SELL
and JANET LECKIE
BY
Hoag, Kilburn & Carlson.
ATTORNEYS United States Patent Office 2,779,681
Patented Jan. 29, 1957

2,779,681
METHOD OF PREPARING AND PACKAGING MEAT

Henry B. Sell, New York, N. Y., and Janet Leckie, Fairfield, Conn., assignors to Sell's Specialties, Inc., New York, N. Y., a corporation of New York Application October 31, 1952, Serial No. 317,986

6 Claims. (Cl. 99—174)

This invention relates to a new article comprising food and particularly meat in a sealed envelope, and to a process of preparing food and particularly meat for refrigerator storage. This application is a continuation-in-part of our co-pending application Serial No. 103,204, filed July 6, 1949, now abandoned.

Parcels embodying our invention have been successfully prepared comprising a wide variety of foods and particularly meats including whole turkeys and chickens, beef, veal, ground meat, fresh ham and food mixtures including a large percentage of meat and known in the trade as "chili meat" and "spaghetti meat."

In preparing the new food article or parcel embodying our invention a whole fowl such as turkey or chicken may be employed without removing the meat from the skeleton. Instead some of the rib bones of the fowl are broken and it is trussed before it and its sealed envelope are compacted to predetermined shape. Other meats, such as roast beef are first boned and then compacted as will be described.

An object of the invention is to provide parcels of food adapted for storage in a refrigerator.

Another object of the invention is to provide a process and product by means of which a maximum of meat may be stored in a given storage space.

Another object of the invention is to provide an improved process whereby a supply of food to be used from time to time may be efficiently prepared in a mass cooking operation and stored in a refrigerator.

Another object of the invention is to provide food in units substantially equal in volume and in a way which simplifies inventory and bookkeeping control.

Another object of the invention is to provide food for storage in hygenic ready-to-eat condition.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a perspective view of a volume of meat to be processed;

Figure 2 is a view similar to Figure 1 but showing the meat enclosed in a wrapper;

Figure 3 is an elevational view showing the wrapped meat after insertion in a plastic bag;

Figure 4 is a view similar to Figure 3 but showing the assembly after the bag has been shrunk;

Figure 5 is an exploded view showing in perspective a meat mold including compacting cover; and Figure 6 is a perspective view showing the final molded product comprising the sealed plastic bag and its contents.

By way of illustration the invention is described herein in connection with a roast of beef. We take a quarter of roast beef and first bone it, and then take off the excess fat, after which the meat is cut into volumes of approximately ten pounds each. An individual volume, 10, is then, preferably but not necessarily, heated and partly cooked. In the case of solid meat it is seared to keep in the meat juices and brown its exterior. In the case of ground meats they are partly cooked in a kettle at boiling temperature. Next, after salting and compacting the volume of meat, we wrap it in a wrapping of parchment paper 12 such as Patapar. The volume of meat 10 with its covering of parchment 12 wrapped tightly therearound is next inserted in a moisture proof flexible envelope 14 and the envelope is then sealed along the line 16, Figure 3.

The envelope 14 is preferably one formed from molecularly oriented shrinkable film of plastic polymer. We have had very good results using plastic envelopes made from film which is a stretched oriented copolymer of vinylidene chloride and vinyl chloride. Such envelopes are commercially available, and the method of making such film and the resulting product is fully disclosed in United States Patents No. 2,183,602, No. 2,205,449, No. 2,233,442, No. 2,235,782, No. 2,309,370, No. 2,320,112, No. 2,329,571, No. 2,340,834, No. 2,390,035, No. 2,409,521, and No. 2,452,080. A plastic envelope of said kind remains in stretched condition until exposed to an elevated temperature when it shrinks substantially and thereafter remains set and is not susceptible to renewed stretching and shrinking. The shrinking action commences at temperatures substantially above room temperature and in the case of envelopes made of the film disclosed in said patents this effect is obtained to the greatest degree within a range of temperatures from approximately 200 to 210° F. However, we have found that the lower limit of the temperature range wherein shrinking is obtained is not altogether definite but for our purpose may be defined as being near, or on the order of, 175° F.

The parchment wrapped meat is inserted in the moisture-proof shrinkable envelope, the one selected being of a size to closely fit around the meat and open at only one end and the air is evacuated from the envelope, as by attaching it to a vacuum pump, thus collapsing the envelope around the wrapped meat, and the envelope is hermetically sealed, a straight line of seal 16 being shown in Figure 3 by way of illustration, close to the top of the wrapped meat therein but allowing for shrinkage of the envelope.

The sealed envelope and contents is then heated to a temperature sufficient to shrink the envelope thus causing it to fit around the parchment wrapped meat tightly, like an outer skin, the shrunken envelope thus holding the parchment tightly against the meat. It is desirable to perform the heating of the envelope for the shrinking step quickly. While other ways of heating it may be employed we prefer to dip the sealed envelope and its contents into a vessel containing water heated to a temperature on the order of 175° F., or higher.

The step of heating the flexible envelope also constitutes a second preheating step, aiding in maintaining the uniform heating obtained by the initial preheating and cooking step.

Following the shrinking of the envelope the sealed envelope 14 and its contents are placed in a metal container 18 which serves as a mold, to shape the assembly of envelope and contents, as well as a cooking vessel, and therefore should have the length and width desired for the resulting unit product. Next the compacting member 20, which is part of the molding apparatus but is not intended to be a cover for the mold 18 in the sense of sealing the member 18 or providing a closure over the meat within the member 18, is forced down on the assembly of the meat and its envelope 14 until the assembly assumes the shape of the mold and is substantially free of voids. For forcing down the compacting member 20 a pressure machine (not shown) may be employed which presses down on the springs 22 shown extending upwardly from member 20 thereby forcing member 20 yieldingly down onto the contents of the mold and thereby flattening out said contents until it has a smooth level surface on top as well as on its sides and on its bottom. As the member 20 is being forced downward the clamp members 24, which are the legs of an inverted U-shaped member 23, are moving downwardly over the turned over upper edge 26 of the mold, and by engagement of their teeth 25 with said edge of the mold serve to hold the cover in the desired compacting position during the cooking operation and until released following the cooking operation.

It is desirable in order to obtain the best results that all the steps of the process and particularly the steps of inserting the envelope and its contents in a mold, the compacting of the meat by lowering the member 20 within the mold, and the placing of the mold in an open cooking vessel, follow as speedily as possible after the heat treatment of the envelope to shrink it in order to take advantage of the preheating steps described above, thereby reducing the period of time required for the cooking and sterilizing step, and causing the meat to be more uniformly cooked than is the case when the meat is cold at the beginning of the cooking operation in which case the outside of the meat reaches the cooking temperature much quicker than the inside of the meat with the result that the meat is apt to be overdone on the outside and underdone on the inside.

After the compacting step member 20 is in place and the mold including member 20 and its contents is placed in an open cooking vessel, which desirably is large enough to take several molds 18 simultaneously, and which contains sufficient water to cover the mold or molds therein. Since a compacting member 20 does not provide a seal between itself and the side and end walls of the mold 18 the water comes into direct contact with the envelope 14 comprising the assembly of envelope and contents within the mold. The water is heated to a temperature on the order of 180° F., if it is desired to heat the interior of the meat to approximately 160° F., as is customary if it is desired that the cooked meat be in rare condition, or is raised to what is known as a rolling boil or 212° F. if it is desired to heat the interior of the meat to a temperature of approximately 180° F., which is the approximate temperature for obtaining meat which is fairly well done, and the meat is cooked in its envelope for a period of approximately four hours.

The cooking temperatures mentioned above are not sterilizing temperatures but are known as "stabilizing" temperatures. They destroy all air borne bacteria which may have been included in the envelope when sealed, and all bacteria transmitted by human handling prior to the insertion of the meat in, and sealing of, the envelope 14, and in addition eliminate some of the meat borne bacteria. They also eliminate any trichinae larvae, which produce the disease trichinosis, and are killed at 150° F. and also moulds. Any meat borne bacteria which are not killed are "stabilized," which means that the bacteria do not multiply during a period of storage up to at least sixty days at a refrigerating temperature on the order of 35–40° F.

It will be noted that the step of cooking the meat while in its flexible envelope 14, in counter distinction to first cooking the meat and then placing it in the envelope 14, results in the cooking being done after all possibility of contamination of the meat by either air borne bacteria or human borne bacteria. We have found that as a result meat prepared according to our process, when taken out of its envelope 14 after a refrigerating period of sixty days, is in hygienic condition ready to eat. Furthermore it has an attractive appearance without the fuzzy, grey appearance denoting mould growths and which is characteristic of meat which is exposed after cooking and before being refrigerated.

Immediately following the cooking we remove the assembly 28 of the envelope and its contents from the mold and chill it, as for example by immersing it in cold water, preliminary to putting it into a refrigerator, and this chilling step serves to stiffen the assembly of the meat in its envelope and retain it in its molded form. This stiffening results from the hardening of the fat within the meat and the jelling of the gelatin which is present in the meat, and is furthered by the temperature within the refrigerator so that the assembly retains its molded form in storage and provides an article as the product of the process which is easy to handle and which provides a maximum of food for a given area of storage space. Since the volume of meat in each pre-shaped, pre-cooked article is substantially the same it will be known how many individual servings will be provided by the meat contents of each parcel when removed from its envelope 14, and thus any number of individual servings may be provided without delay and substantially upon demand.

This process of preparing food and storing it in a refrigerator simplifies the problem of clubs and hotels and restaurants where it is often impossible to accurately predict in advance the number of meals that will be required, and serves to eliminate waste in such operations which has heretofore often been a very serious source of loss. Furthermore by preparing and storing food as disclosed herein an important saving can be effected in storage space and this is often of the utmost importance. For example, in stocking submarines of the United States Navy with food we have found that our invention has made it possible to effect a saving of half of the storage space previously required for bulk foods and at the same time provided a greater volume of food i. e. more food per man, thus enabling the submarine to remain away from base longer, and with a substantial elimination of food waste and garbage.

Similarly the invention described herein lends itself to the increasingly popular system of preparing food centrally for distribution in the form of pre-cooked meals. A supply of pre-cooked meat may be prepared in advance and drawn upon from time to time as required and in each instance the food is immediately available for use upon removal of the parcels from the refrigerator, by merely separating the envelope 14 from the meat and heating the meat as may be desired.

It will thus be seen that there has been provided by this invention a method and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

What we claim is:

1. The process of preparing and packaging meat in ready-to-eat condition which comprises, taking a number of substantially equal units of meat, preheating said units, seasoning said units, wrapping each unit in parchment paper, enclosing each unit and its wrapper in a moisture proof, flexible, and shrinkable envelop, evacuating and shrinking each envelop to cause it to fit tightly around said unit of meat and its wrapper, inserting the packages, each comprising a unit of meat, its wrapper and its enclosing envelop, into individual containers, stacking the containers within a cooking vessel and simultaneously cooking the meat comprising said packages while in said containers respectively.

2. The process of preparing and packaging meat in ready-to-eat condition which comprises, taking substantially equal units of meat, heating said units individually, seasoning the units, wrapping the units in parchment paper, enclosing each unit and its wrapper in a moisture proof, flexible and shrinkable envelop, evacuating and shrinking each envelop to cause it to fit tightly around said unit of meat and its wrapper, inserting the packages, comprising meat, wrapper and envelop, into individual containers, stacking the containers within a cooking vessel, cooking the meat comprising said packages while in said containers respectively, and performing the steps between enclosing of the units in said envelopes and the cooking step while the meat is in a preheated condition.

3. The process of preparing and packaging solid meat in ready-to-eat condition which comprises, removing bones and excess fat from the meat, dividing the meat into units of substantially equal volume, searing the units individually to keep in the meat juices and brown the exterior of the meat, seasoning the units, wrapping each unit in a wrapper of parchment paper, enclosing each unit of meat and wrapper individually in a moisture proof, flexible and shrinkable envelope, evacuating and shrinking each envelope to cause it to fit tightly around the said unit of meat and its wrapper, inserting the packages, each comprising a unit of meat, its wrapper and its enclosing envelop, respectively into molds of the shape desired for the final product, stacking the molds within a cooking vessel and exerting pressure simultaneously upon the packages within said cooking vessel to mold the packages individually to a desired size and shape, and maintaining said packages under compacting pressure while cooking said meat units within said molds.

4. The process of preparing and packaging ground meat in ready-to-eat condition which comprises, dividing the meat into units of substantially equal volume, partly cooking the meat at boiling temperature, wrapping each volume of meat in a suitable wrapper to compact the unit and retain the meat juices, enclosing each unit of meat and wrapper individually in a moisture proof, flexible and shrinkable envelop, evacuating and shrinking each envelop to cause it to fit tightly around the unit of meat and its wrapper, inserting the packages, each comprising a unit of meat, its wrapper and its enclosing envelop, respectively into molds of the shape desired for the final product, stacking the molds within a cooking vessel, exerting pressure simultaneously upon the packages within said cooking vessel to mold the packages individually to a desired size and shape, and maintaining said packages under compacting pressure while cooking said meat units within said molds.

5. The process of preparing and packaging fowl in ready-to-eat condition which comprises, breaking some of the rib bones of a fowl and trussing the fowl, heating the fowl, seasoning it, wrapping it in parchment paper, enclosing it in a moisture proof, flexible and shrinkable envelop, evacuating and shrinking the envelop to cause it to fit tightly around the said fowl and its wrapper, inserting a number of such packages, each comprising a fowl, its wrapper and its enclosing envelop, respectively into containers, stacking the containers within a cooking vessel and simultaneously cooking the fowl comprising said packages within said containers respectively.

6. The process claimed in claim 5 in which the steps between preheating and cooking are performed while the fowl remains heated.

References Cited in the file of this patent

UNITED STATES PATENTS

| 2,048,447 | Hewitt | July 21, 1936 |
| 2,182,891 | Eikel | Dec. 12, 1939 |
| 2,366,169 | Barth | Jan. 2, 1945 |
| 2,444,127 | Zublin | June 29, 1948 |
| 2,664,358 | Eichler | Dec. 29, 1953 |

OTHER REFERENCES

"Modern Packaging," September 1950, pages 93 and 94.

"Frosted Food Field," October 1951, page 8, article entitled Whole Zero Turkey Is Dressed, Stuffed.